United States Patent [19]

Hansen

[11] Patent Number: 4,841,319
[45] Date of Patent: Jun. 20, 1989

[54] APPARATUS FOR LOADING A FILM CASSETTE INTO A CAMERA

[75] Inventor: David E. Hansen, Fairport, N.Y.

[73] Assignee: Eastman Kodak Company, Rochester, N.Y.

[21] Appl. No.: 191,445

[22] Filed: May 9, 1988

[51] Int. Cl.[4] .................. G03B 17/02; G03B 17/26
[52] U.S. Cl. .............................. 354/275; 354/212; 354/288
[58] Field of Search ............... 354/212, 214, 275, 288; 352/72, 78; 242/71.1, 71.7

[56] References Cited

U.S. PATENT DOCUMENTS

| | | | |
|---|---|---|---|
| 4,332,453 | 6/1982 | Seely | 354/288 |
| 4,339,193 | 7/1982 | Harvey | 354/288 |
| 4,363,547 | 12/1982 | Hashimoto et al. | 354/212 |
| 4,407,579 | 10/1983 | Huff | 354/275 |
| 4,423,943 | 1/1984 | Gold | 354/275 |
| 4,472,038 | 9/1984 | Muramatsu | 354/211 |
| 4,655,574 | 4/1987 | Fields | 354/212 |
| 4,697,903 | 10/1987 | Koda et al. | 354/288 |
| 4,752,797 | 6/1988 | Sekine et al. | 354/288 |

Primary Examiner—A. A. Mathews
Attorney, Agent, or Firm—Roger A. Fields

[57] ABSTRACT

A compartment defining a cassette receiving chamber in a photographic camera is movable outwardly from the camera body to insert the type of 35 mm film cassette that contains a non-protruding film leader into the chamber. A loading opening to the chamber has a continuous enclosed perimeter commensurate in shape with an outline of the aforementioned film cassette. This feature prevents the type of film cassette that has a protruding film leader from being inserted into the chamber, by obstructing the protruding film leader.

10 Claims, 6 Drawing Sheets

APPARATUS FOR LOADING A FILM CASSETTE INTO A CAMERA

CROSS-REFERENCE TO A RELATED APPLICATION

Reference is made to commonly assigned copending application Ser. No. 173,396, entitled FILM CASSETTE, and filed Mar. 25, 1988 in the names of Jeffrey C. Robertson and Mark D. Fraser.

BACKGROUND OF THE INVENTION

1. Field of the Invention

The invention relates generally to photography and particularly to apparatus for loading a 35 mm film cassette into a camera.

2. Description of the Prior Art

Generally speaking, commercially available 35 mm film cassettes comprise a hollow cylindrical shell having an integral throat or lipped portion which extends tangentially from the shell. A film spool on which the filmstrip is wound is freely rotatable within the cylindrical shell. The filmstrip has a leading end section, commonly referred to as a "film leader", which extends through a light-trapped slit in the throat portion to the outside of the shell. Typically, the film leader is 2-3 inches in length and is normally curled about the shell.

When loading a conventional camera with such a film cassette, a rear door of the camera is widely opened. Then, the cassette with the film leader held uncurled from around the cylindrical shell is inserted into a rear loading chamber in the camera. The manually straightened leader is positioned with its leading tip adjacent a take-up drum in the camera and with one or more of its perforations in engagement with a corresponding number of teeth of a metering sprocket located between the take-up drum and the loading chamber. This film loading operation is rather troublesome and requires a certain amount of skill and manual dexterity. Accordingly, it is rather difficult for certain people.

More recently, several bottom loading cameras have been proposed which include simple means for automatically uncurling the film leader from around the cylindrical shell as the film cassette is inserted endwise, i.e. axially, through a bottom opening to the loading chamber in the camera. For example, in commonly assigned U.S. Pat. No. 4,332,453, granted June 1, 1982, the automatic uncurling means comprises a quarter-round corner located adjacent the loading chamber in the camera and an inclined straight edge extending generally along the bottom of the camera. When a bottom door of the camera is widely opened and the cassette is initially inserted into the loading chamber, a full width (uncut) section of the film leader adjacent the throat portion of the cassette is pushed against the quarter-round corner. The quarter-round corner in turn deflects the full width section of the leader to position a reduced width (cut) section of the leader forward of the full width section crosswise against the inclined straight edge. Then, with continued insertion of the cassette into the loading chamber, the reduced width section of the leader is progressively straightened by its movement against the inclined straight edge. Thus, the film leader is progressive uncurled as the cassette is inserted axially into the loading chamber.

Although known bottom loading cameras which include automatic uncurling means for the film leader appear to work satisfactorily, the structure in the camera comprising such means may tend to increase manufacturing costs to a significant extent. Moreover, as in the case of known rear loading cameras, bottom loading cameras typically required that a door of the camera be opened before the loading can begin.

A 35 mm film cassette has been proposed which, unlike conventional film cassettes, includes a film leader that does not extend outside the cassette shell. The leader, instead, is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the leading end of the filmstrip is reduced in width to allow it to protrude from between the circumferential lips and rest against the shell wall. During unwinding rotation of the film spool, the leading end of the filmstrip is advanced to and through a film passageway opening in order to exit the cassette shell. The opening has a width which is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette appears to be intended to be loaded in a camera only after the film leader is advanced to protrude from the cassette shell. In the patent, it is suggested that one manually rotate the film spool relative to the cassette shell until the leader can be manually grasped and attached to a film advancing device in a camera.

The Cross-Referenced Application

Like the type of film cassette disclosed in U.S. Pat. No. 4,423,923, the cross-referenced application discloses a film cassette that contains a non-protruding film leader which is automatically advanced to the outside of the cassette shell in response to rotation of the film spool in the unwinding direction.

SUMMARY OF THE INVENTION

According to the invention, there has been devised a photographic camera which substantially facilitates the cassette loading operation. Specifically, the invention is an improved camera wherein there is provided a film cassette receiving chamber, and wherein the improvement comprises:

said film cassette receiving chamber being configured to receive the type of film cassette that contains a non-protruding film leader, and including a loading opening having a continuous enclosed perimeter substantially commensurate in shape with an outline of the aforementioned film cassette to prevent the type of film cassette that has a protruding film leader from being inserted into the chamber.

Thus, since the cassette receiving chamber is adapted to only receive a film cassette having a non-protruding film leader, the loading operation is made simpler as compared to prior art devices.

DETAILED DESCRIPTION OF THE PREFERRED EMBODIMENT

The invention is disclosed as being embodied preferably in a 35 mm camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette

Figure 1:
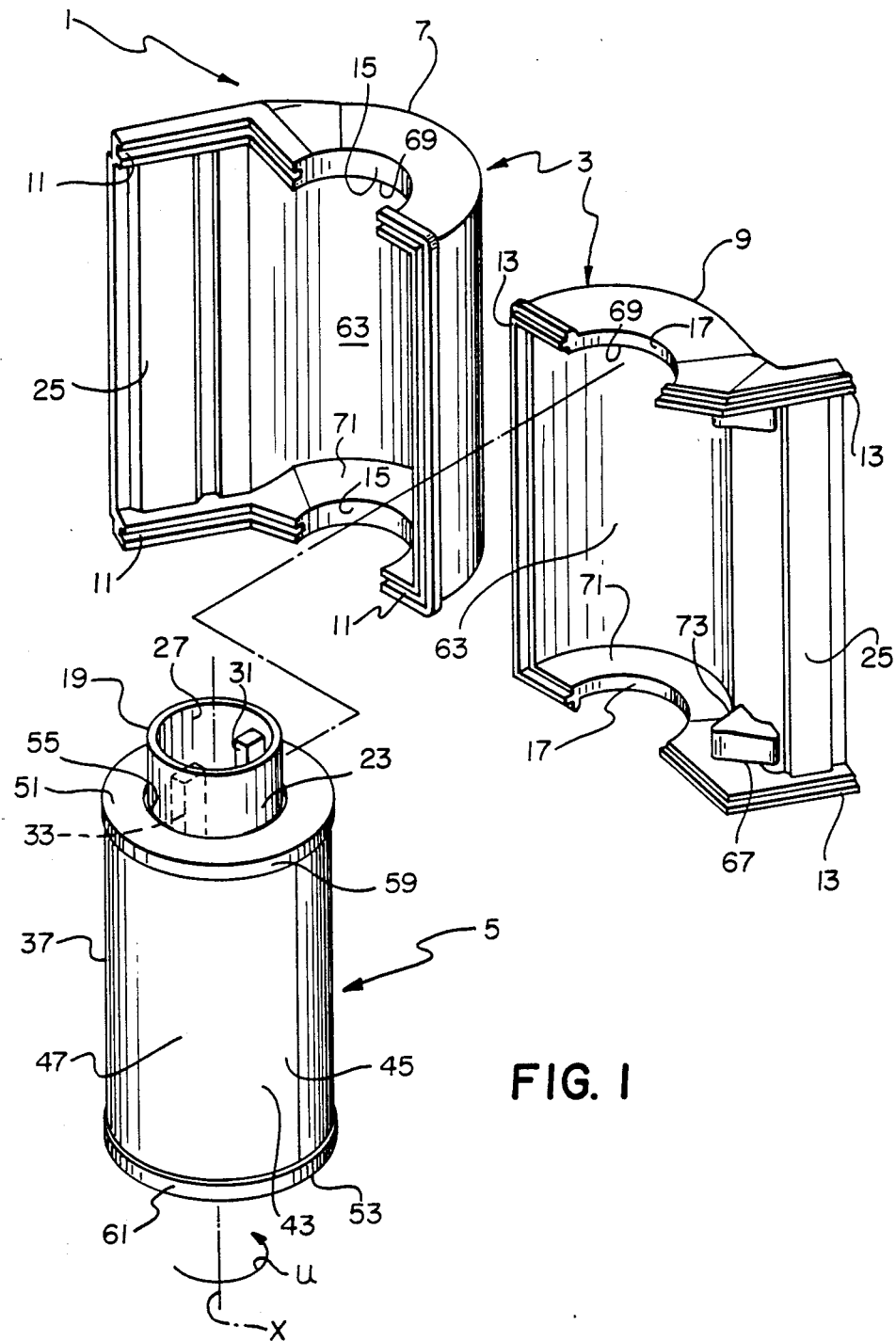
FIG. 1 is an exploded perspective view of a film cassette having a non-protruding film leader.
Figure 2:
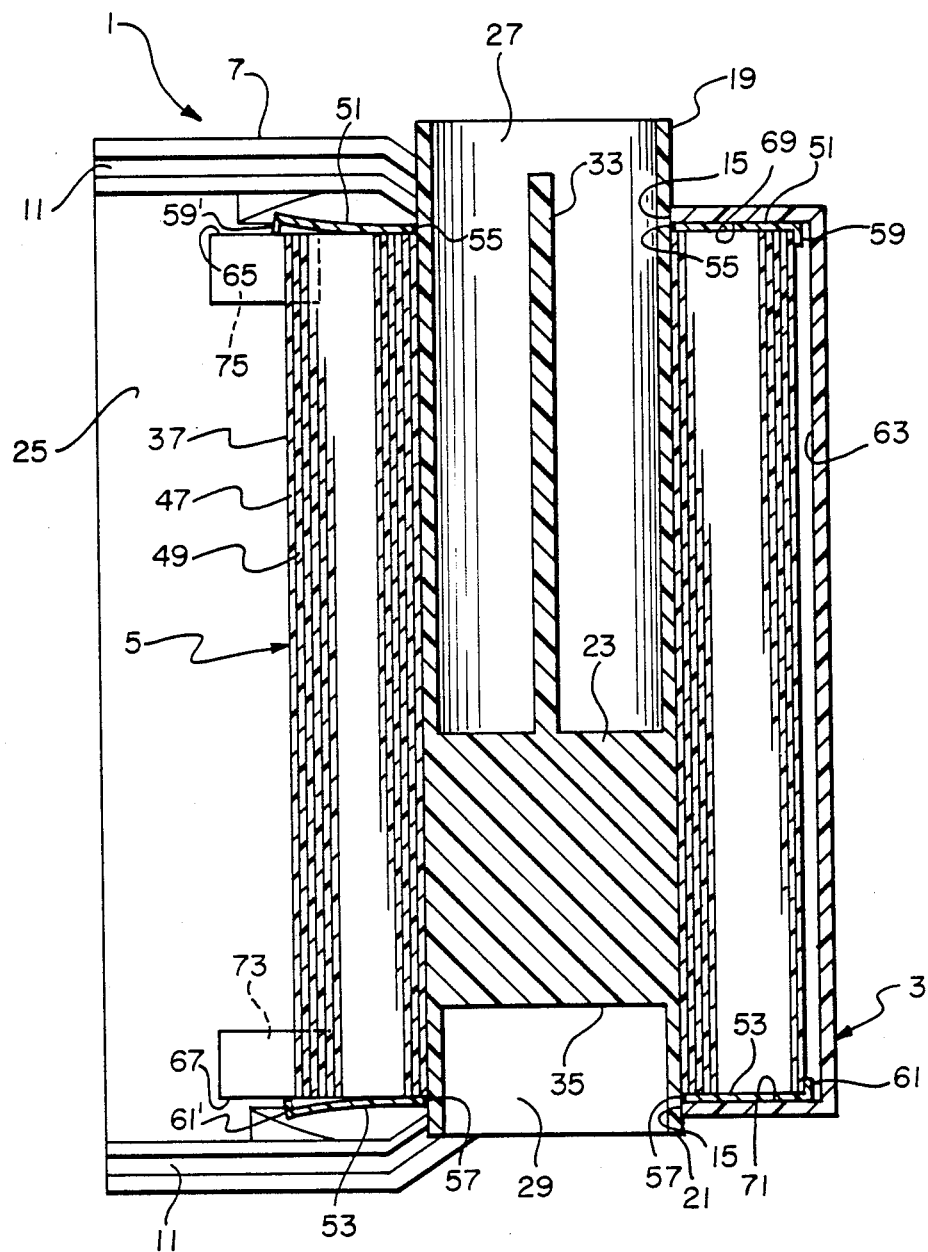
FIG. 2 is an elevation view in cross-section of the film cassette.
Figure 3:
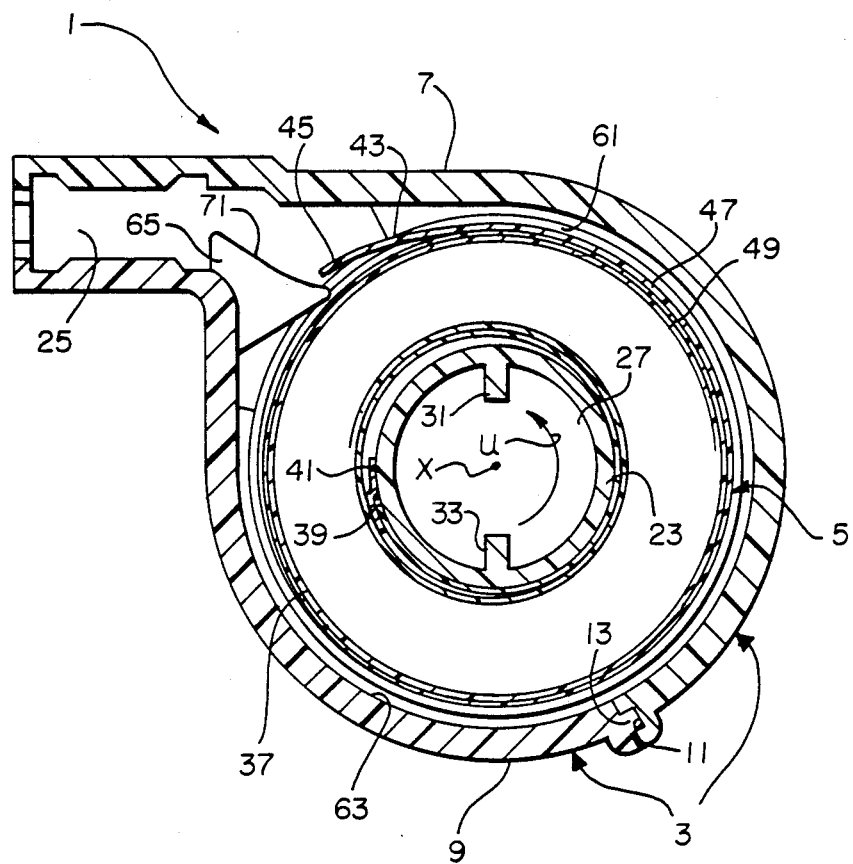
FIG. 3 is an end view in cross-section of the film cassette.

Referring now to the drawings, FIGS. 1-3 depict an improved 35 mm film cassette 1 substantially as disclosed in the application cross-referenced above. Specifically, the film cassette 1 comprises a light-tight cassette shell 3 and a film spool 5 rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a winding direction opposite to the unwinding direction.

A roll 37 of convoluted 35 mm film having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2–3 convolutions of the film roll 37. One of these leader convolutions is the outermost convolution 47 and another of them is the next inward succeeding convolution 49.

A pair of flexible identical disks 51 and 53 are coaxially spaced along the spool core 23 to lightly rest against the opposite ends of the film roll 37. The two disks 51 and 53 cover the opposite ends of the film roll 37 and they have respective central holes 55 and 57 through which the spool core 23 longitudinally extends to permit rotation of the spool core relative to the disks. Although not shown, it is possible for the spool core 23 to include integral radially extending flanges disposed between the opposite ends of the film roll 37 and the respective disks 51 and 53. The two disks 51 and 53 have respective continuous circumferential lips 59 and 61 which extend at right angles to the peripheries of the disks to radially confine the outermost convolution 47 of the film roll 37, thereby to prevent the film roll from radially expanding or clock-springing into contact with an inner wall 63 of the cassette shell 3. As shown in FIG. 1, the leading end 45 of the film roll 37 is similarly confined by the circumferential lips 59 and 61. However, the leading end 45 may be tapered to allow it to slightly protrude from between the two lips 59 and 61.

A pair of rigid identical spreader surfaces 65 and 67 are fixed to the cassette half 9 at separate locations inwardly of the film passage slit 25 as shown in FIGS. 2 and 3. The two spreader surfaces 65 and 67 deflect opposite limited sections 59' and 61' of the respective lips 59 and 61 axially away from each other to an axial dimension slightly exceeding the film width. See FIG. 2. In essence, the deflected sections 59' and 61' of the two lips 59 and 61 are axially spaced sufficiently to prevent those sections of the lips from radially confining corresponding sections of the outermost convolution 47 of the film roll 37. As indicated in FIGS. 1 and 2, the remaining portions of the two lips 59 and 61 are maintained in place by inner semi-circular flat surfaces 69 and 71 of the cassette shell 3 which abut the respective disks 51 and 53, except in the vicinity of the two spreader surfaces 65 and 67. Thus, the remaining portions of the two lips 59 and 61 continue to radially confine the outermost convolution 47.

When the spool core 23 is initially rotated relative to the cassette shell 3 in the unwinding direction U, the two disks 51 and 53 may remain substantially stationary and the film roll 37, since its inner end 39 is attached to the spool core, tends to expand radially to ensure a non-slipping relation between the outermost convolution 47 of the film roll and the circumferential lips 59 and 61 of the disks. Then, rotation of the spool core 23 in the same direction will similarly rotate the two disks 51 and 53. As a result, the two spreader surfaces 65 and 67 will deflect successive sections of the circumferential lips 59 and 61 axially away from each other as the respective sections are rotated past the spreader surfaces. The deflected sections of the two lips 59 and 61 are returned to their original non-flexed condition by the semi-circular flat surfaces 69 and 71. As can be appreciated from FIG. 3, the leading end 45 of the film roll 37 will be freed from the radial confinement of the two lips 59 and 61 in the vicinity of the two spreader surfaces 65 and 67 and it will be advanced against a pair of rigid identical stripper-guide surfaces 73 and 75 integrally formed with the respective spreader surfaces. The two stripper-guide surfaces 73 and 75 operate to direct the leading end 45 into the film passage slit 25, thereby allowing succeeding sections of the outermost convolution 47 to be freed from corresponding sections of the two lips 59 and 61 as those sections of the lips are deflected by the two spreader surfaces 65 and 67. Consequently, continued rotation of the spool core 23 will thrust the film leader 43 from the cassette shell 3.

The Photographic Camera

Figure 4:
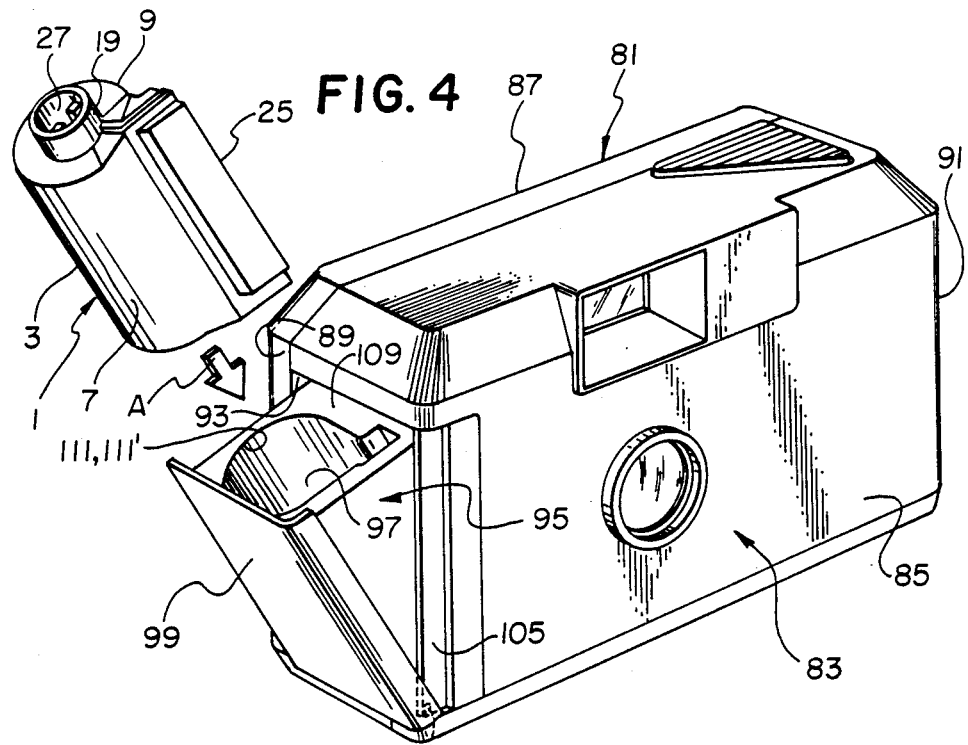
FIG. 4 is a front perspective view of an improved camera according to a preferred embodiment of the invention, showing a cassette receiving chamber in a cassette receiving position exposed outside the camera body.
Figure 5:
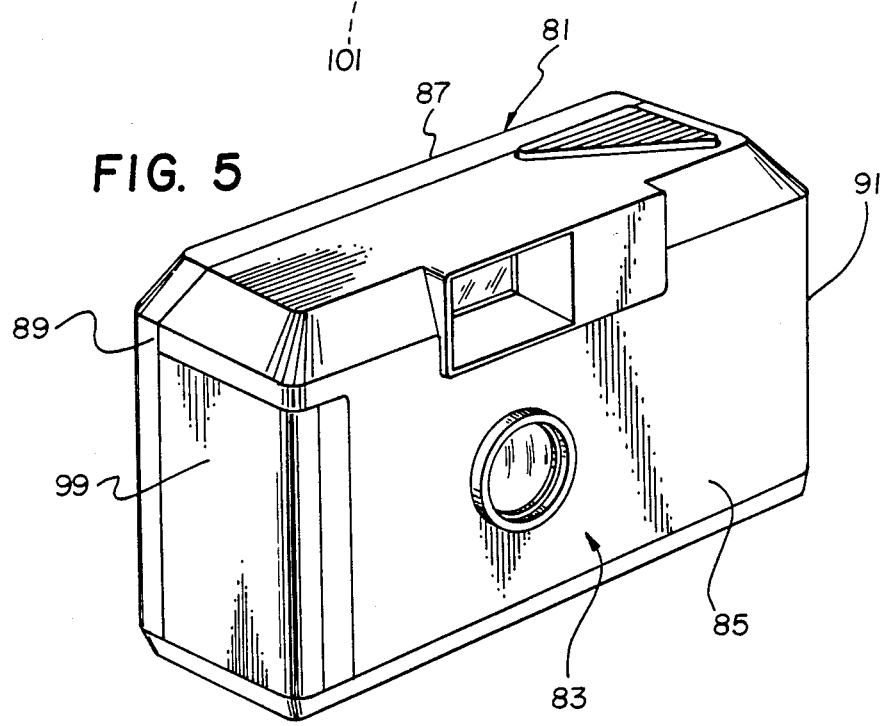
FIG. 5 is a front perspective view of the improved camera, wherein the cassette receiving chamber is in a concealed position within the camera body.
Figure 7:
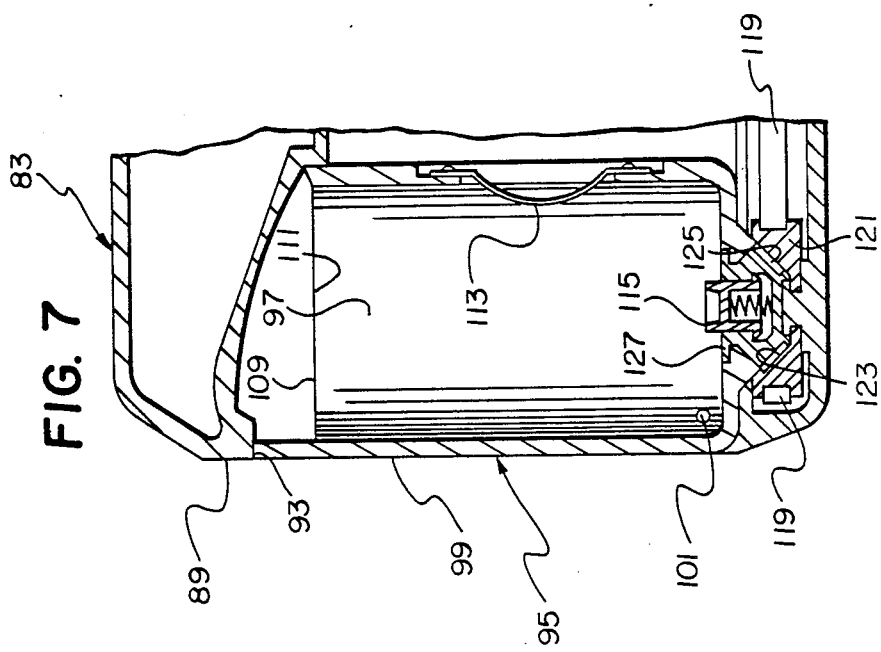
FIG. 7 is a sectional view of the cassette receiving chamber in its concealed position.
Figure 6:
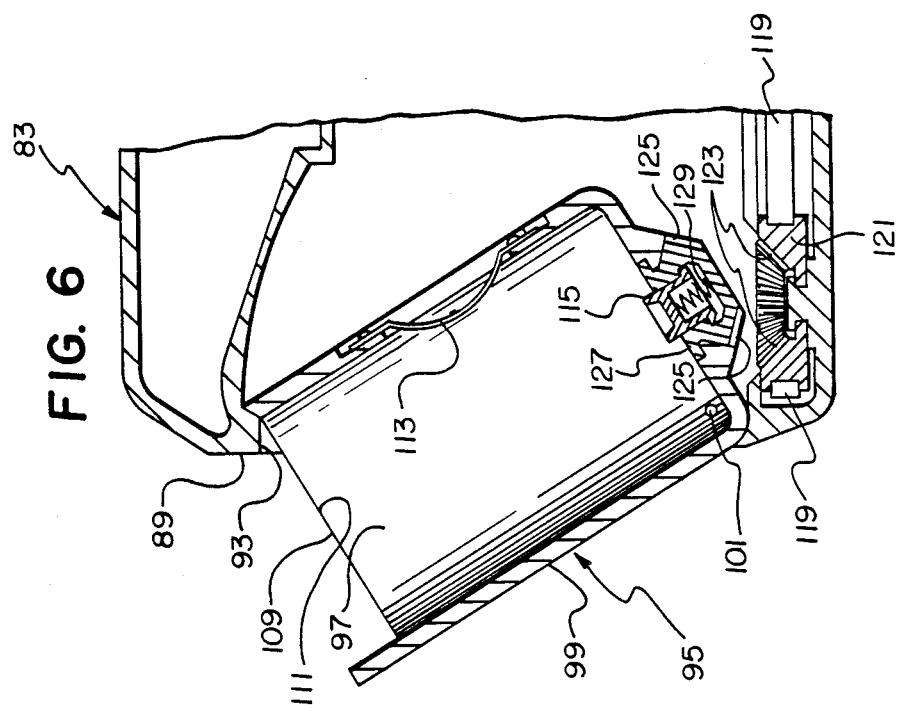
FIG. 6 is a sectional view of the cassette receiving chamber in its cassette receiving position.
Figure 8:
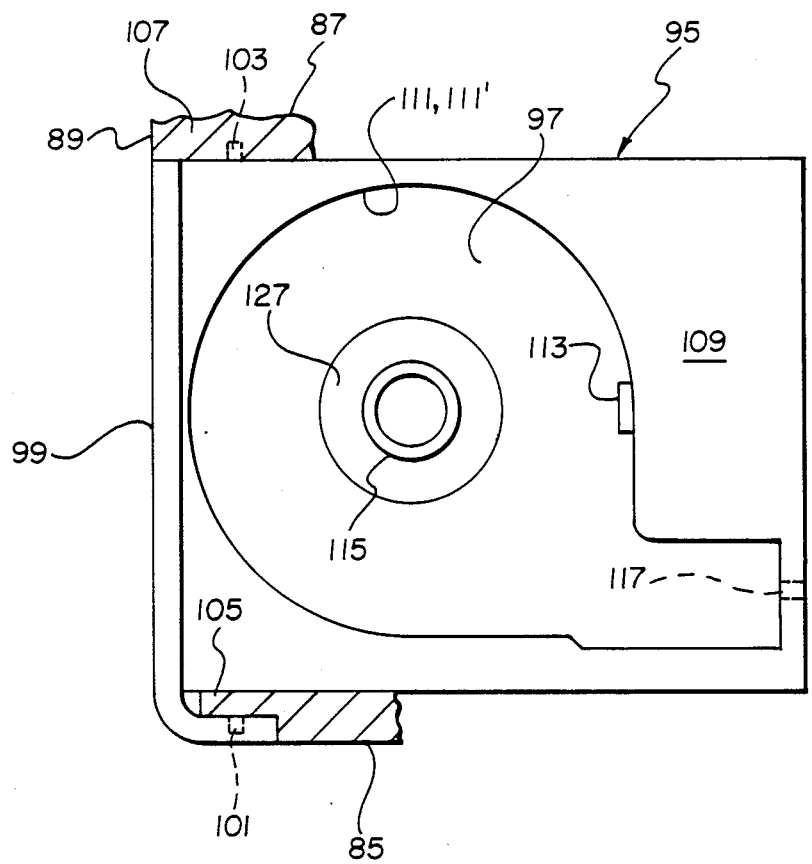
FIG. 8 is a top plan view of a loading opening to the cassette receiving chamber.

Referring now to FIGS. 4-8, an improved camera 81 is depicted for use with the film cassette 1. The camera body 83 as shown in FIG. 4 has a pair of relatively large front and rear faces 85 and 87 and a pair of opposite ends 89 and 91 located between the two faces. The opposite end 89, which is the leftward one in FIG. 4, has a rectangular-shaped opening 93 to the interior of the camera body 83. A block-like compartment or casing 95 includes a cassette receiving chamber 97 for receiving the film cassette 1 endwise, i.e. axially, in the direction indicated by the arrow A, and an end cover 99 for covering the end opening 93. The compartment 95 is connected as best seen in FIG. 8 via a coaxial pair of pivot pins 101 and 103 to respective front and rear portions 105 and 107 of the camera body 83 for pivotal movement through the end opening 93 between a concealed position, illustrated in FIGS. 5 and 7, in which the cassette receiving chamber 97 is located within the interior of the camera body, and a cassette receiving position, illustrated in FIGS. 4 and 6, in which the chamber is exposed outside the end opening. The end opening 93 is dimensioned with respect to the compartment 95 as shown in FIGS. 4 and 6 to allow only the compartment to pass through the end opening during movement of the compartment between its concealed and cassette receiving positions. In particular, a top surface 109 of the compartment 95 blocks access to the interior of the camera body 83, through the end opening 93, when the compartment is in its cassette receiving position.

The cassette receiving chamber 97 includes a loading opening 111 at the top surface 109 of the compartment 95 which has a continuous enclosed perimeter 111' substantially commensurate in shape with an outline of the film cassette 1. See FIGS. 4 and 8. As a result, only a 35 mm film cassette which contains a non-protruding film leader can be inserted into the chamber 97. A conventional 35 mm film cassette, which is a type provided with a protruding film leader, cannot be inserted into the chamber 97 because the top surface 109 will obstruct the protruding film leader. A restraining spring 113 in the chamber 97 serves to secure the film cassette 1 within the chamber.

As shown in FIGS. 6 and 7, a rotation shaft 115 projects from the bottom of the cassette receiving chamber 97 to engage the keying rib 35 of the film cassette 1 to rotate the spool core 23 of the film cassette in the unwinding direction U in order to thrust the non-protruding film leader 43 from the cassette shell 3 as described in detail above. A narrow opening 117 is provided in the compartment 95 below its top surface 109 to allow the film leader 43 to exit the cassette receiving chamber 97. Typical drive means for rotating the shaft 115 comprises an endless belt 119 which extends in driving relation about a pulley 121. The pulley 121 includes an inclined annular array of gear teeth 123 adapted to mesh with a similar array of gear teeth 125 formed on an idler wheel 127. The idler wheel 127 engages the shaft 115 to rotate the shaft, but it permits the shaft to be moved axially by a helical compression spring 129 in order to ensure that the shaft engages the keying rib 35 of the film cassette 1. Another known drive means for rotating the shaft 115 is illustrated in U.S. Pat. No. 4,363,547, granted Dec. 14, 1982.

In operation, the compartment 95 is pivoted to its cassette receiving position, illustrated in FIGS. 4 and 6, thereby separating the array of gear teeth 125 from the array of gear teeth 123. The film cassette 1 is inserted endwise into the cassette receiving chamber 97 to engage the spool core 23 with the rotation shaft 115. Then, the compartment is pivoted to its concealed position, illustrated in FIG. 7, to bring the two arrays of gear teeth 125 and 123 into engagement. Accordingly, rotation of the shaft 115 will rotate the spool core 23 to thrust the film leader 43 from the cassette shell 3.

The invention has been described with reference to a preferred embodiment. However, it will be appreciated that variations and modifications can be effected within the ordinary skill in the art without departing from the scope of the invention. For example, the compartment 95 could be supported for sliding rather than pivotal movement between its concealed and cassette receiving positions. According to a second example, the compartment 95 could be accessible at the rear face 87 of the camera body 83 rather than at the one end 89 of the camera body. According to a third example, the cassette receiving chamber 97 could be designed to receive the film cassette 1 sideways rather than endwise. According to a fourth example, the film cassette 1 need not be a 35 mm type, but instead could be a variation of that type, such as 30 mm, 31 mm, 32 mm, etc. According to a fifth example, the leading end 45 of the film roll 37 within the cassette shell 3 could initially be located within the film passage slit 25 rather than as shown in FIG. 3. Alternatively, the leading end 45 could extend very slightly outside the cassette shell 3, but not far enough to be obstructed by the top surface 109 of the compartment 95. Thus, the term "non-protruding" as it refers to the film leader 43 in this application is meant to include "essentially non-protruding".

I claim:

1. An improved photographic camera wherein there is provided a film cassette receiving chamber, and wherein the improvement comprises:
    said film cassette receiving chamber being configured to receive the type of film cassette that contains a non-protruding film leader, and including a loading opening having a continuous enclosed perimeter substantially commensurate in shape with an outline of the aforementioned film cassette to prevent the type of film cassette that has a protruding film leader from being inserted into said chamber.

2. The improvement as recited in claim 1 further comprising:
    means supporting said cassette receiving chamber for movement relative to the camera body between a concealed position within said camera body and a cassette receiving position in which said loading opening is exposed outside the camera body.

3. The improvement as recited in claim 2, wherein said camera body has an opening dimensioned with respect to said chamber defining means to allow only the chamber defining means to pass through said opening during movement of said chamber defining means between its concealed and cassette receiving positions.

4. An improved photographic camera wherein a camera body has relatively large front and rear faces and relatively small opposite ends located between said faces, and wherein the improvement comprises:

one of said opposite ends of the camera body having an opening to the interior of said camera body;

means defining a film cassette receiving chamber configured to receive only the type of film cassette that contains a non-protruding film leader; and means supporting said chamber defining means for movement through said opening at the one end of said camera body between a concealed position in the interior of the camera body and a cassette receiving position exposed outside said opening.

5. The improvement as recited in claim 4, wherein said chamber defining means includes a loading opening to said cassette receiving chamber, said loading opening having a general shape for inserting the type of film cassette that contains a non-protruding film leader axially into said cassette receiving chamber and a continuous enclosed perimeter for preventing film leader from being inserted axially into the cassette receiving chamber by obstructing the latter film leader.

6. The improvement as recited in claim 5, wherein said opening at the one end of said camera body is dimensioned with respect to said chamber defining means to allow only the chamber defining means to pass through the opening during movement of said chamber defining means between its concealed and cassette receiving positions.

7. The improvement as recited in claim 6, wherein said chamber defining means includes an end cover adapted to cover said opening at the one end of said camera body in response to movement of the chamber defining means to its concealed position.

8. The improvement as recited in claim 6, wherein said chamber defining means includes respective surfaces adapted to block access to the interior of said camera body through said opening at the one end of the camera body regardless of whether the chamber defining means is in its concealed or cassette receiving position.

9. The improvement as recited in claim 8, wherein said supporting means for said chamber defining means mounts the chamber defining means to pivot between its concealed and cassette receiving positions.

10. The improvement as recited in claim 4, wherein said supporting means for said chamber defining means includes respective connections between the chamber defining means and substantially front and rear portions of said camera body.

* * * * *